(No Model.)

C. G. BARTH.
FEED OPERATING DEVICE.

No. 547,474. Patented Oct. 8, 1895.

WITNESSES:
Stevenson H. Walsh
Craig Shields

INVENTOR
Carl G. Barth.
by his attorney
Chas. A. Rutter

UNITED STATES PATENT OFFICE.

CARL G. BARTH, OF DARBY, PENNSYLVANIA.

FEED-OPERATING DEVICE.

SPECIFICATION forming part of Letters Patent No. 547,474, dated October 8, 1895.

Application filed January 20, 1894. Serial No. 497,503. (No model.)

*To all whom it may concern:*

Be it known that I, CARL G. BARTH, a citizen of the United States, and a resident of Darby, in the county of Delaware, State of Pennsylvania, have invented certain new and useful Improvements in Feed-Operating Devices, of which the following is a specification.

My invention relates to improvements in feed-operating devices, and the object of my invention is to furnish a simple, compact, and efficient device by means of which the number of possible rotations ordinarily given to a feed-shaft of a machine-tool, for instance, may be greatly increased.

My device, which may be used in connection with any of the ordinary devices for transmitting the rotation of one shaft to another in a series of variable ratios, consists of an arrangement of back gearing added to this latter shaft, by means of which its series of variable rotations may be repeated in such a low ratio that the total number of possible ratios of rotation then obtainable will form a consecutively diminishing series.

Figure 1:
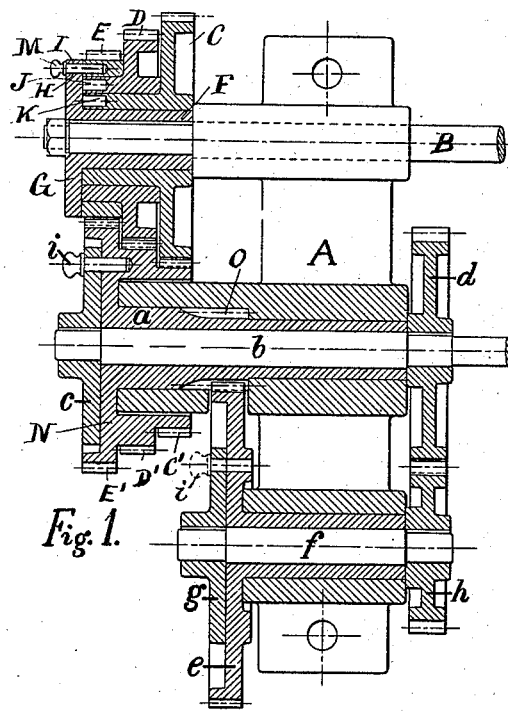
Figure 2:
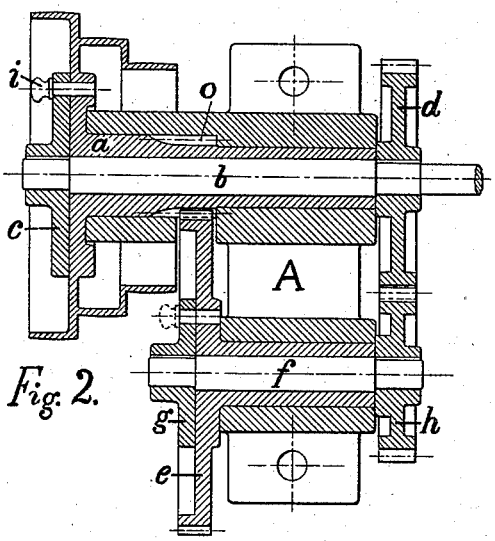
Figure 3:
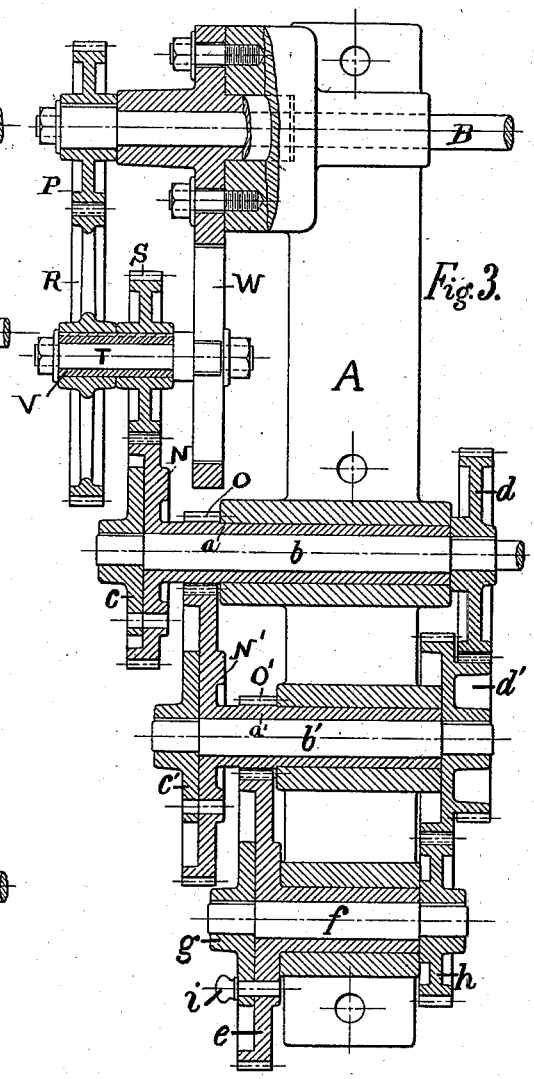

In the accompanying drawings, forming part of this specification, and in which similar letters of reference indicate similar parts throughout the several views, Figure 1 shows the application of my device to the ordinary arrangement of conical feed-gears, the drawing being a central sectional elevation through the nest of conical feed-gears and through my arrangement of back gearing. Fig. 2 shows the application of my device to the ordinary arrangement of cone-pulleys, the receiving-pulleys and their connected parts, and my device being shown in central sectional elevation; and Fig. 3 shows the application of my device to the ordinary arrangement of swing-frame and change-gears, the several parts being shown in central sectional elevation.

A represents a support upon which the bearings of the several shafts are carried; b, the feed-shaft through which motion is communicated to the machine.

Referring first to Fig. 1, B is a shaft which may be driven in any suitable manner, and C D E are conical feed-gears. The gear C is adapted to revolve upon a sleeve F, keyed fast to shaft B, the gear D to revolve upon the hub of gear C, and the gear E to revolve upon the hub of gear D. G is a collar upon sleeve F, which is furnished with holes H, but one of which is shown in the drawings. I J K are holes in the hubs of gears C D E. M is a pin adapted to pass through one of the holes H in the collar G and enter the hole in that one of the gears C D E which it is desired to have driven by the shaft B. In the drawings the pin M is shown coupling the gear E to the collar G, and the shaft B is accordingly driving the gear E. N is a gearwheel upon the shaft b. The face of this wheel forms three gears C' D' E', the teeth of which are adapted to be engaged and driven by the teeth of gears C D E. In the drawings the gear E' is being driven by the gear E while the gears C D are being run idly by the gears C' D'. This is the ordinary conical feed-gear arrangement for driving the feed-shaft b when gear N is keyed fast to said shaft. In my arrangement the gear N is not keyed fast to the feed-shaft b, but is free to revolve upon this shaft, but it can be coupled to the shaft through a collar c, fast to the shaft, and a pin i passing through this collar and into a hole in the gear. Upon the hub a of gear N the gearteeth O are cut, which mesh with and drive a gear e, which is loosely carried by a shaft f, and which may be coupled to this shaft by means of a collar g, fast to said shaft, and the pin i passing through said collar and into a hole in said gear. h is a gear keyed fast to shaft f; d, a gear keyed fast to shaft b and meshing with and at times driven by and at times driving the gear h idly. When the pin i is coupling collar c and gear N, the speed of rotation of the shaft b relatively to the shaft B can only be varied by throwing into operative gear with gear N one of the gears C D E; but if the pin i be withdrawn from collar c and gear N and used to couple collar g and gear e, three additional feeds may be obtained. The coarsest additional feed would be obtained by coupling gear C to shaft B. This gear would drive the gear C' on gear N, gear-teeth O would drive gear e, which, through collar g and pin i, would drive the shaft f, with its gear h, which again would drive gear d, and hence the feed-shaft b. Finer feeds would be obtained in a similar manner by coupling either of the gears D E to the driving-shaft B.

In Fig. 2 my device is shown applied to the usual cone-pulley arrangement. In this case the receiving-pulleys are not keyed fast to feed-shaft $b$, but are free to turn on this shaft, and their hub is furnished with gear-teeth O. A collar $c$, fast to shaft $b$, may be coupled to the pulleys by means of a pin $i$. A gear $e$, loose on shaft $f$, gears with gear-teeth O. A collar $g$, fast to shaft $f$, may be coupled to gear $e$ by means of pin $i$, when it is withdrawn from collar $c$ and the pulleys. A gear $h$, fast to shaft $f$, meshes with a gear $d$, fast to feed-shaft $b$. This arrangement is precisely similar in construction and operation to that described above in connection with Fig. 1.

In Fig. 3 the application of my device to the ordinary swing-frame and change-gear feed motion is shown in repeated application. B is the primary driving-shaft; P a change-gear driven by a feather on this shaft and driving the change-gear R on the feathered sleeve V on the adjustable stud T on the swing-frame W; S, another change-gear on the sleeve V gearing with and driving a gear N, loose upon the shaft $b$, which carries a fast collar $c$ and a fast gear $d$, similar to those described in Figs. 1 and 2. In Fig. 3 the reduction of the feed is carried out further than in Figs. 1 and 2 by the gear-teeth O on hub of gear N gearing into and driving a gear N', loose on a shaft $b'$, but adapted to be coupled to this shaft by means of a collar $c'$, fast to this shaft, and a pin $i$, as hereinbefore described. Upon hub $a'$ of gear N' is a gear O', which gears with and drives gear $e$, which is loose on shaft $f$. As shown in the drawings, gears N N' are free to turn upon shafts $b\, b'$, while gear $e$ is coupled to and turns shaft $f$. The shaft B, being revolved, revolves gear P, which revolves gear R, which drives sleeve V and gear S, which drives gear N, pinion O, gear N', gear O', gear $e$, shaft $f$, gear $h$, which drives gear $d'$, which drives gear $d$ and shaft $b$. It will be seen that pin $i$ may be withdrawn from collar $g$ and gear $e$ and used to couple collar $c'$ and gear N', in which case gears $e$ and $h$ will be thrown out of effective action. When desired, the pin $i$ may also be used to couple collar $c$ and gear N, in which case the gears N' $d'$ $e$ $h$ will all be thrown out of effective action, and the rotation of the feed-shaft $b$ be effected by the change-gears only. The repeated diminution of the feed may be carried out further by additional gearing and shafts, similar to those shown.

I have termed the gears P, R, and S referred to above as "change-gears", because, not being keyed tight to but only slipped loosely on the feathers of the shaft B and the sleeve V, they may be easily interchanged or even entirely replaced by others for the purpose of changing the rate of rotation of the gear N. Such interchanging or replacing of these gears necessitates, however, a readjustment of the distances between the shafts B and $b$ and the stud T, this being made possible through the frame W being provided with the straight slot shown in the drawings, and in which the stud T can be clamped anywhere, and also with circular slots for the bolts that clamp it to the stand A, and which therefore permit of the frame being swung into various positions around the shaft B. This arrangement of change-gears and swing-frame is a common one on all screw-cutting lathes.

Machine-tool-feeding devices which allow of only a limited number of changes between the coarsest and finest amounts of feed obtainable should as a rule be so arranged that the several feeds will be in geometrical progression, though this is not generally recognized, and, in fact, I believe, not generally obtainable beyond three feeds without some arrangement like my back gearing. While thus, for instance, a nest of conical feed-gears of three-pitch diameters, such as that shown in Fig. 1, will always give three speeds in a perfect geometrical progression, it is only in rare cases possible to so select the numbers of teeth and the pitches of the various gears of a nest of cone-gears of more than three-pitch diameters that the resulting speeds will be in a perfect geometrical progression, and for cone-gears as now, I believe, universally made of the same pitch and on a straight cone the result is only more or less an approximation to a geometrical progression. By means of a suitable ratio of reduction of the back gearing all the six feeds obtainable in each of the cases represented by Figs. 1 and 2, or the nine that would be obtained by a repetition of the back gearing similar to that shown in Fig. 3 can be arranged in a perfect geometrical progression.

My invention is not only applicable to the feeding device shown in the drawings, but also to all other forms of feeding device in which a rotary motion is used.

I do not desire to confine myself to the use of the pin $i$ for coupling the several collars, gears, &c., as it is evident that other devices—a clutch, for instance—may be used for this purpose; but I prefer to use the pin $i$, because it has to be withdrawn from one place in order to be used at another and thus obviates the possibility of coupling up in more than one place at one time.

Having thus described my invention, I claim—

1. In a feed operating mechanism, in combination, a feed shaft, a shaft, as $f$, parallel to said feed-shaft, mechanism for driving said shafts at different rates of speed, means for coupling said driving mechanism to or for uncoupling it from said feed shaft, mechanism for transmitting rotation from said parallel shaft to said feed shaft, and means for coupling said feed shaft to or for uncoupling it from said latter mechanism.

2. The combination of a feed operating shaft, mechanism for driving the same at different rates of speed and adapted to be connected to or disconnected from said shaft, a gear wheel connected to and driven by said driving mechanism, a gear wheel adapted to be driven by this gear wheel, a shaft upon which said gear is loosely mounted, means for coupling said gear to said shaft, a gear wheel fast on said shaft, and a gear wheel fast on said feed operating shaft and adapted to be driven by said gear on said second shaft.

CARL G. BARTH.

Witnesses:
JOHN T. RAMSDEN,
HARRY G. STEWART.